United States Patent
Ramesh et al.

(10) Patent No.: US 11,803,519 B2
(45) Date of Patent: *Oct. 31, 2023

(54) METHOD AND SYSTEM FOR MANAGING AND SECURING SUBSETS OF DATA IN A LARGE DISTRIBUTED DATA STORE

(71) Applicant: Dataguise, Inc., Fremont, CA (US)

(72) Inventors: Subramanian Ramesh, San Jose, CA (US); Jaspaul Singh Chahal, Fremont, CA (US)

(73) Assignee: Dataguise, Inc., Milwaukee, WI (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/231,706

(22) Filed: Apr. 15, 2021

(65) Prior Publication Data

US 2021/0232546 A1 Jul. 29, 2021

Related U.S. Application Data

(63) Continuation of application No. 14/216,840, filed on Mar. 17, 2014, now Pat. No. 11,010,348.

(60) Provisional application No. 61/793,584, filed on Mar. 15, 2013.

(51) Int. Cl.
*G06F 16/00* (2019.01)
*G06F 16/182* (2019.01)

(52) U.S. Cl.
CPC .............................. *G06F 16/182* (2019.01)

(58) Field of Classification Search
CPC ..................................................... G06F 16/182
See application file for complete search history.

(56) References Cited

U.S. PATENT DOCUMENTS

| | | |
|---|---|---|
| 6,510,434 B1 | 1/2003 | Anderson et al. |
| 9,191,279 B1 | 11/2015 | Torney et al. |
| 2004/0054681 A1 | 3/2004 | Pitts |
| 2005/0091248 A1 | 4/2005 | Pitts |
| 2009/0282262 A1 | 11/2009 | Nonoyama et al. |
| 2010/0036840 A1 | 2/2010 | Pitts |
| 2012/0066509 A1 | 3/2012 | Lapp et al. |
| 2013/0232341 A1 | 9/2013 | Movshovitz |

*Primary Examiner* — Hung Q Pham
(74) *Attorney, Agent, or Firm* — Barich IP Law Group

(57) ABSTRACT

A system groups multiple entities in a large distributed data store (DDS), such as directories and files, into a subset called a domain. The domain is treated as a unit for defining policies to detect and treat sensitive data. Sensitive data can be defined by enterprise or industry. Treatment of sensitive data may include quarantining, masking, and encrypting, of the data or the entity containing the data. Data in a domain can be copied as a unit, with or without the same structure, and with transformations such as masking or encryption, into parts of the same DDS or to a different DDS. Domains can be the unit of access control for organizations, and assigned tags useful for identifying their purpose, ownership, location, or other characteristics. Policies and operations, assigned at the domain level, may vary from domain to domain, but within a domain are uniform, except for specific exclusions.

6 Claims, 4 Drawing Sheets

METHOD AND SYSTEM FOR MANAGING AND SECURING SUBSETS OF DATA IN A LARGE DISTRIBUTED DATA STORE

RELATED APPLICATIONS

The present application is a continuation of U.S. patent application Ser. No. 14/216,840, filed Mar. 17, 2014, entitled "Method and System for Managing and Securing Subsets of Data in a Large Distributed Data Store," which claims the benefit of priority to the U.S. Provisional Patent Application No. 61/793,584, filed Mar. 15, 2013, entitled "Method and System for Managing and Securing Subsets of Data in a Large Distributed Data Store," both of which are hereby incorporated by reference in their entirety.

FIELD OF THE INVENTION

New approaches to data organization, such as Hadoop's HDFS, or MongoDB, implement a highly distributed file or document-oriented database system on commodity servers, and support parallel processing. The number of entities (documents, files, directories, collections) in these systems can be in the millions. The present invention proposes a method that organizes this data into logical subsets, and then secures each subset and enables its movement to another location, either in the same big data system or a different big data system.

BACKGROUND OF THE INVENTION

Big data systems are employed by enterprises for large-scale data storage and management. Typically they are large distributed file systems like Hadoop HDFS, document-oriented database systems like MongoDB or Couchbase, or distributed key-value stores such as HBase. In this paper we refer to all of the above as "Distributed Data Stores" (DDS). DDSs provide the ability to store huge amounts of data on commodity hardware. In addition, DDSs provide multiple features such as parallel processing, restricted access to data, transparent replication, and fault tolerance. These features enable multiple concurrent users to use DDSs to access large quantities of data for data mining and analysis, which are the typical usage areas for DDSs.

DDSs are often used to store data collected from the web, such as Twitter feeds and Facebook conversations, call records from call centers and telephones, transaction data for financial institutions, and weather data. DDSs generally house a wide variety of information, and are accessed by a variety of end users within enterprises. Managing this large quantity of information, especially with a view towards securing it, is a challenge.

For example, in a large enterprise, subsets of a DDS may be marked for use by different departments. Each of these subsets may have completely different requirements for security and access controls to be maintained, whether the data can be copied, and what kind of policies need to be in place to ensure that the integrity of the data is not compromised. Some subsets may be open to the public, whereas other subsets may have information that only a select few can access.

There is therefore a need for a method and system for dividing data in DDSs such as the ones mentioned above into logical subsets, which can then be managed from the security and operational point of view.

BRIEF DESCRIPTION OF THE FIGURES

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the invention.

Figure 1:
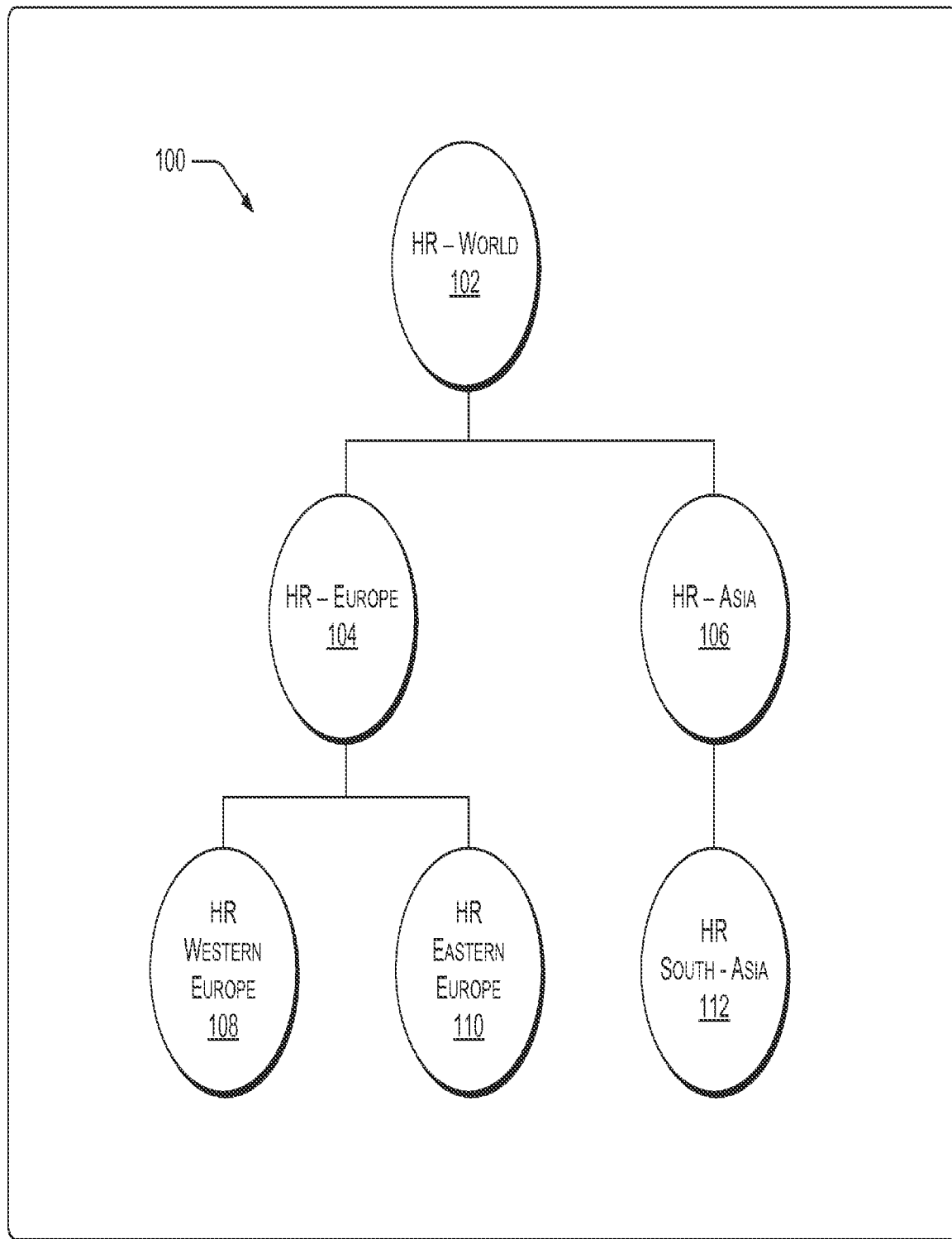
FIG. 1, illustrates a view of a large DDS 100 with multiple domains 102, 104, 106, 108, 110 & 112. Each domain 102, 104, 106, 108, 110 & 112 in turn will contain multiple directories, files, or collections of documents.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to a method and system for managing subsets of data in a large distributed data store (DDS.) Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, or apparatus that comprises a list of elements does not include only those elements but may include other elements not expressly listed or inherent to such process, method, or apparatus. An element preceded by "comprises . . . a" does not, without more constraints, preclude the existence of additional identical elements in the process, method, or apparatus that comprises the element.

Generally speaking, pursuant to various embodiments, the invention provides a method and a system for managing subsets of data in a large DDS 100. A domain, such as domain 102, 104, 106, 108, 110 or 112 is defined as a set of one or more directories, files, collections, documents, or other logical units of data in one or more DDSs 100 & 300. The example system utilizes an application programming interface (API) or other available means of communicating with a DDS cluster, e.g., DDS cluster 100 or 300, in order to obtain information about the components of the DDS 100, such as directories, files, and collections. The example system also uses the same means for performing operations such as, but not limited to, discovering sensitive data items, quarantining, masking, or encrypting sensitive data in domains, and for copying domains. The example system stores metadata information about domains 102, 104, 106, 108, 110 & 112 in its repository (which is typically outside the DDS 100, but can also be inside the DDS 100), and maps the information about components of the DDS 100 such as directories, files, collections, and documents, to the domain metadata information to manage the domains 102, 104, 106, 108, 110 & 112.

Referring to the drawings and in particular to FIG. 1, an exemplary logical diagram of a DDS 100 containing a hierarchy of domains, for example domains 102, 104, 106, 108, 110 and 112 is disclosed. HR-World 102, for example, is a root-level domain, and HR-Europe 104 and HR-Asia 106 are also domains, which happen to be subdomains of root level domain HR-World 102. In an embodiment, HR-World 102 need not exist, in which case, HR-Europe 104 and HR_Asia 106 are root-level domains. HR-Western-Europe 108 and HR-Eastern-Europe 110 are subdomains of HR-Europe 104, and HR-South-Asia 112 is the single subdomain of HR-Asia 106.

Properties may be assigned to the domains 102, 104, 106, 108, 110 & 112 through the system described in later sections, and depicted in FIG. 4. All the constituents of a domain, e.g., domain 102, (i.e., all directories and files marked as being part of the domain 106 in the case of a Distributed File System) are also assigned the properties of the domain 106. By default, a subdomain, e.g., domain 112, and its constituents will also be assigned the properties of the respective parent domain, e.g., domain 106. Examples of such inheritable properties include an encryption key to be used for security, categories of data that are considered sensitive, policies to mask specific types of sensitive data, business tags to be attached to the data in the domain 106, access rights to groups of users over the constituents of the domain 106 (files and directories in the case of a Distributed File System, collections and documents in the case of a Distributed Document-oriented Database.) The set of properties listed above is purely exemplary, and does not limit other properties from being attached to the domain.

In an embodiment, constituent of a DDS 100 (for example a directory or a file) may belong to multiple domains, with rules governing which policies are in effect where the policies of the multiple domains are in conflict. In a scenario, subdomains 112 may have some or all relevant policies that are different from those of their parent domains 106. This change from the usual norm of having subdomains possess the same properties as their parent domains is selected in an explicit manner. But by default, subdomains 112 inherit the policies of the parent domain 106.

In an example embodiment, a directory in Hadoop Distributed File System (a type of DDS 100) may be assigned as the root 102 of the domain, and all subdirectories automatically become part of that domain 102. In another embodiment, subdirectories do not automatically become part of the root domain 102 unless explicitly marked as member of the domain 102. In yet another embodiment, subdomains (e.g., 104) of a main domain (e.g., 102) may be restricted to being subdirectories of the root directory of the main domain 102. In yet another embodiment, this restriction may not be there. In the most general case, a domain is simply a set of entities (for example, files, directories, collections, documents) that is marked as being part of the domain, irrespective of their location within the structure of the DDS 100.

Once one or more domains are marked, policies can be attached to them. The policies may include but are not limited to sensitive data policies, backup and restore policies, access policies, and others that may affect the constituents of the domain in any way.

In the case of sensitive data policies, in an embodiment, the enterprise may select a set of sensitive data types it needs to protect within the DDS 100. Examples of such data types include, but are not limited to, credit card numbers, social security numbers, medical record numbers, addresses, names of patients, names high net-worth individuals, driver's license numbers, and bank account numbers. There can also be policies controlling how exactly the sensitive data, once found, is treated. For example, one policy could say that credit card numbers should be masked with a format-preserving masking. The same policy may say that social security numbers need to be encrypted with a particular encryption key. A different policy may say that telephone numbers need to be masked consistently, where consistency means that identical masked values replace originally identical sensitive values, in this case telephone numbers. The same policy may say that any file containing email addresses needs to be quarantined, i.e., access to it should be restricted. Once the policies relating to data security are defined, tasks run for detecting and sensitive data on constituents of the domain 102 will need to adhere to those policies.

Another example of security related policies assignable to a domain 102 is the management of encryption and decryption keys to be used in encryption sensitive items in a domain. In an embodiment, policies can be set to use a particular encryption key for a particular period of time in a domain. Policies can also be set for when the key would expire, and a new key would be used. Key strength and key type may also be set at domain level.

In another scenario, backup policies can be assigned to a domain 102, whereby the time of incremental and full backup can be set at the domain level. Other scenarios include assignment of different fine-grained access rights to the constituents of a domain to various users. Some users may have read access to all files containing social security numbers, whereas others may not. The user who has access to social security numbers in one domain 102 may not have access to the same in another domain.

In yet another scenario, business or other tags may be applied to an entire domain 102, so that reporting systems such as a dashboard may analyze the information about sensitive data using the tags as filters. Tags may indicate that the domain belongs to a particular region, division, or department of the company; they may also indicate that the domain has data of a particular classification level, or the data pertain to a particular region or language.

Figure 2:
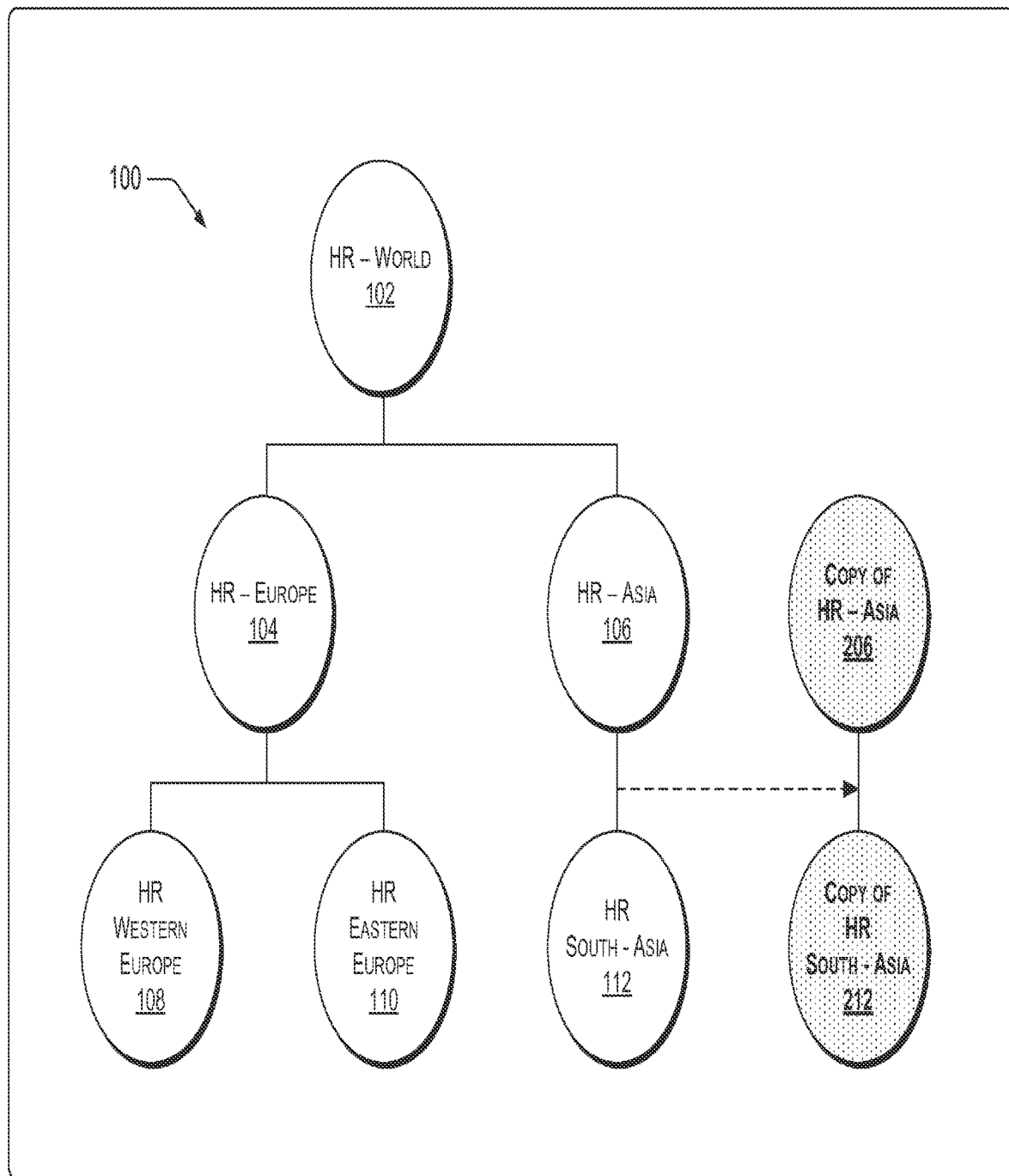
FIG. 2 illustrates a copy action whereby one domain 106 (including its subdomain 112) is copied 206 (& 212) to another location in the same DDS 100.

FIG. 2 depicts the copying of a domain 106, including its subdomain 112 to another location (e.g., 206 & 212) within the same DDS 100. In a scenario, the new domain 206 may be automatically be given a new name, which can be modified. The new domain 206 will initially have the properties of the source domain 106, and these can also be modified. In another scenario, the data in the new domain 206 may be created after masking all sensitive data from the source domain based on certain policies. Therefore, in this case, the source domain 106, has the sensitive data, but the new domain 206 has only de-identified data. In yet another scenario, the sensitive data from the source domain 106 may be encrypted before copying to a new domain 206. The same source domain 106 may be used for multiple of such transformations.

Figure 3:
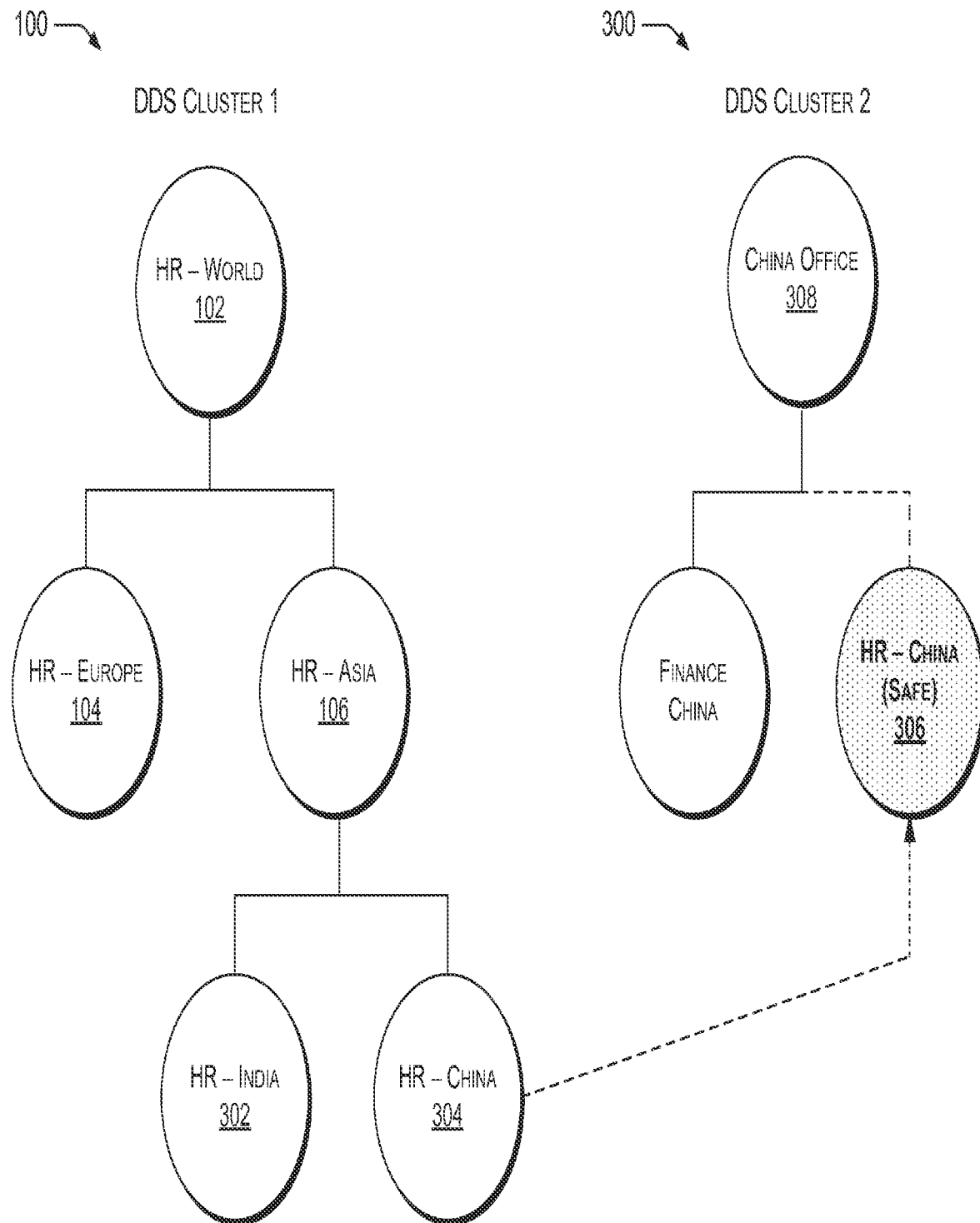
FIG. 3 illustrates copying between multiple DDS's 100 & 300, including a copy action whereby one domain 304 (including its subdomains) from a first DDS 100 is copied 306 to a second DDS 300.

FIG. 3 describes another embodiment of copying domains 304, but this time between two DDS clusters 100 and 300. The source domain 304 is in one DDS 100, and the new copied domain 306 is another DDS 300. In the most general case, the second DDS 300 may be of a completely different type. In an embodiment, the connectivity software required for this copy between DDS clusters may be part of an example system described in FIG. 4. In another embodiment, the transfer of domains may apply connectivity software that is part of a third-party tool. From the user viewpoint, copying within a DDS 100 and between multiple DDS's 100 & 300 is substantially identical in terms of steps to follow, resulting in a very easy to use interface.

Figure 4:
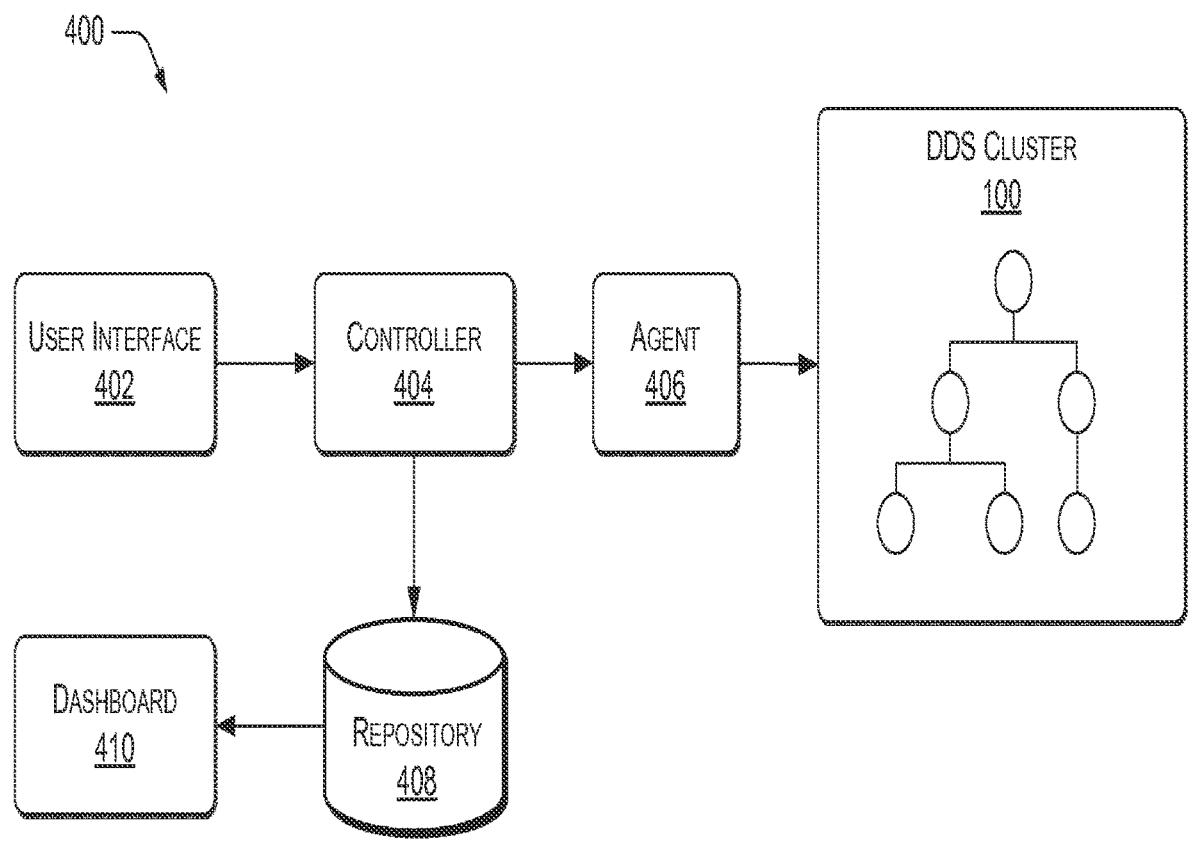
FIG. 4. Illustrates a system 400 for managing domains in a DDS 100 & 300.

FIG. 4 describes an example system 400 for managing domains in one or more DDS clusters 100 & 300. FIG. 4 describes one embodiment of such an example system 400, other configurations are possible and can be built to achieve the same effect in managing domains. A user interface 402 enables each end-user to perform operations on domains such as, but not limited to, creation of a domain 102 and association of the domain 102 with various constituents of the DDS 100; creation of policies for sensitive data discovery, masking, quarantine, and encryption, and association of those policies with the domain 102; creation and management of policies for backup and association of those policies with one or more domains 102; creation and management of encryption and decryption key policies and association with one or more domains 102; creation of subdomains 104 within domains 102; creation of policies to be used while copying domains 106; actual copying of the domains 206 either within a DDS 100 or to another DDS 300. The user interface 402 is also used to start discovery, masking, encryption, or quarantine tasks on one or more domains 102, and to view the results of these tasks. Further, the user interface 402 may be used to create tags, and associate these tags with one or more domains 102.

An example controller 404 interacts with the user interface 402, and packages requests to an example agent 406, which interacts with the DDS 100. The controller 404 has access to a repository 408 where information created and managed through the user interface 402 is stored. Therefore, the repository 408 contains comprehensive metadata about domains 102, 104, 106, 108, 110 & 112 in the given DDS 100.

The agent 406 interacts with the DDS 100 and performs actions initiated in the user interface 402, such as searching for sensitive data, masking, quarantining, encryption, copying of domains, on the DDS 100. The agent 406 interfaces and performs actions using either the application programming interface (API) of the DDS 100 or by other means.

An example dashboard 410 processes data from the results of sensitive data scans, masking operations, quarantining operations, encryption operations, which are stored in the repository 408, and presents the data in aggregate form to an end user, for example in various visual forms. The example dashboard 410 may display the information filtered for specific domains 106 and subdomains 112. The dashboard 410 may also use the tags, and therefore may show the data partitioned, narrowed, or filtered by the tag values. The dashboard 410 also offers drill-down review, so that a user may examine constituents of a domain 102 to see what operations were performed on the domain 102.

The various embodiments of the invention provide an efficient method for managing and securing data in subsets of a large DDS 100 & 300.

Those skilled in the art will realize that the above-recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as critical, or required.

The invention claimed is:

1. A system for managing data in a Distributed Data Store (DDS), said system including:
   a Distributed Data Store (DDS), wherein said DDS includes a first domain, wherein said first domain comprises a first set of a plurality of data entities, wherein said first set of a plurality of data entities includes one or more directories, files, collections, documents, or other logical units of data,
   wherein said plurality of data entities of said first set are marked as being part of said first domain; and
   wherein said DDS includes a second domain, wherein said second domain comprises a second set of a plurality of data entities, wherein said second set of a plurality of data entities includes one or more directories, files, collections, documents, or other logical units of data,
   wherein said plurality of data entities of said second set are marked as being part of said second domain; and
   a repository storing first metadata relating to said first domain, wherein said first metadata identifies said first domain and identifies a set of first properties of said first domain,
   wherein said set of first properties includes an identification of at least one first sensitive data type,
   wherein said repository includes at least one first policy assigned to said at least one first sensitive data type,
   said repository also storing second metadata relating to said second domain, wherein said second metadata identifies said second domain and identifies a set of second properties of said second domain, wherein said set of second properties is different from said set of first properties
   wherein said set of second properties includes an identification of at least one second sensitive data type,
   wherein said repository includes at least one second policy assigned to said at least one second sensitive data type,
   wherein data is managed in said DDS by scanning said first domain by applying said identification of said at least one first sensitive data type to said first set of a plurality of data entities to identify at least one data entity of said first set of a plurality of data entities as belonging to said at least one first sensitive data type,
   retrieving said at least one first policy assigned to said at least one first sensitive type, and
   applying said at least one first policy to said at least one data entity of said first set of a plurality of data entities belonging to said at least one first sensitive data type, and
   scanning said second domain by applying said identification of said at least one second sensitive data type to said second set of a plurality of data entities to identify at least one data entity of said second set of a plurality of data entities as belonging to said at least one second sensitive data type, retrieving said at least one second policy assigned to said at least one second sensitive type, and applying said at least one second policy to said at least one data entity of said second set of a plurality of data entities belonging to said at least one second sensitive data type.

2. The system of claim 1 wherein at least one of said at least one first policy assigned to said at least one first sensitive data type and said at least one second policy assigned to said at least one second sensitive data type includes masking at least one of said at least one first sensitive data type and said at least one second sensitive data type.

3. The system of claim 1 wherein at least one of said at least one first policy assigned to said at least one first sensitive data type and said at least one second policy assigned to said at least one second sensitive data type includes encrypting at least one of said at least one first sensitive data type and said at least one second sensitive data type.

4. The system of claim 1 wherein at least one of said at least one first policy assigned to said at least one first sensitive data type and said at least one second policy assigned to said at least one second sensitive data type includes quarantining at least one of said at least one first sensitive data type and said at least one second sensitive data type.

5. The system of claim 1 wherein said at least one first sensitive data type and said at least one second sensitive data type are one of credit card numbers, social security numbers, medical record numbers, addresses, names of patients, names high net-worth individuals, driver's license numbers, and bank account numbers.

6. The system of claim 1 wherein said repository is outside said DDS.

* * * * *